United States Patent
Gleich et al.

(10) Patent No.: US 10,997,726 B2
(45) Date of Patent: May 4, 2021

(54) AUTOMATED TUMOR PARTITIONING

(71) Applicant: KONINKLIJKE PHILIPS N.V., Eindhoven (NL)

(72) Inventors: Bernhard Gleich, Hamburg (DE); Jorn Borgert, Hamburg (DE); Jochen Keupp, Rosengarten (DE)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 16/649,237

(22) PCT Filed: Aug. 30, 2018

(86) PCT No.: PCT/EP2018/073296
§ 371 (c)(1),
(2) Date: Mar. 20, 2020

(87) PCT Pub. No.: WO2019/057459
PCT Pub. Date: Mar. 28, 2019

(65) Prior Publication Data
US 2020/0250829 A1    Aug. 6, 2020

(30) Foreign Application Priority Data
Sep. 22, 2017 (EP) ................................ 17192531

(51) Int. Cl.
*G06T 7/11* (2017.01)
*G06T 7/00* (2017.01)
*G06T 7/40* (2017.01)

(52) U.S. Cl.
CPC .............. *G06T 7/11* (2017.01); *G06T 7/0012* (2013.01); *G06T 7/40* (2013.01); *G06T 2207/10072* (2013.01); *G06T 2207/30096* (2013.01)

(58) Field of Classification Search
CPC . G06T 2207/10072; G06T 2207/30096; G06T 7/0012; G06T 7/11; G06T 7/40
See application file for complete search history.

(56) References Cited

U.S. PATENT DOCUMENTS 6,843,638 B2    1/2005  Suri et al.
2006/0247864 A1*  11/2006  Tannez-Pena ........ G06T 7/0012
                                                                702/19
(Continued)

FOREIGN PATENT DOCUMENTS

| WO | 2015040434 A1 | 3/2015 |
| WO | 2015079235 A1 | 6/2015 |
| WO | 2015139963 A1 | 9/2015 |

OTHER PUBLICATIONS

Lian Chunfeng et al "Selecting Radiomic Features from FDG-PET Images for Cancer Treatment Outcome Prediction" Medical Image Analysis, Oxford University Press, vol. 32, May 19, 2016 p. 257-268.

*Primary Examiner* — David Bilodeau (57) ABSTRACT

The invention provides for a medical instrument (100, 300, 400) comprising: a memory (110) for storing machine executable instructions (112) and a processor (106) for controlling the medical instrument. Execution of the machine executable instructions cause the processor to: receive (200) three dimensional medical image data (114) descriptive of a subject (318), wherein the three dimensional medical image data comprises voxels; receive (202) a segmentation of the three dimensional medical image data, wherein the segmentation divides the three dimensional image data into non-tumor voxels (700) and tumor voxels (500); choose (204) a center point (118) of the tumor voxels; divide (206) the tumor voxels into multiple groups (120) using a set of orthogonal planes (502, 504, 600), wherein the center point is within each of the orthogonal planes; calcu-
(Continued)

late (208) at least one group radiomic feature (122) selected from a set of radiomic features for each of the multiple voxel groups; compute (210) a statistical measure (124) for each of the at least one group radiomic feature; calculate (212) a scalar value (128) by calculating the sum of each statistical measure multiplied by a predetermined group weighting value (126), wherein the predetermined group weighting value is unique for each statistical measure; and provide (214) a signal using a signaling interface device (108, 402) if the scalar value is above a predetermined threshold (130).

15 Claims, 6 Drawing Sheets

(56) References Cited

U.S. PATENT DOCUMENTS

| | | | |
|---|---|---|---|
| 2010/0266190 A1* | 10/2010 | Zagorchev | A61B 6/503 |
| | | | 382/132 |
| 2013/0077842 A1* | 3/2013 | El-Zehiry | G06T 7/162 |
| | | | 382/131 |
| 2013/0182931 A1* | 7/2013 | Fan | G06T 7/143 |
| | | | 382/131 |
| 2015/0356730 A1 | 12/2015 | Grove et al. | |
| 2016/0114192 A1* | 4/2016 | Lachaine | A61N 5/1038 |
| | | | 600/1 |
| 2016/0260211 A1 | 9/2016 | Gillies et al. | |
| 2016/0260224 A1 | 9/2016 | Ward et al. | |
| 2017/0216632 A1* | 8/2017 | Lee | A61N 5/103 |
| 2017/0259084 A1* | 9/2017 | Bennett | A61B 6/4258 |
| 2018/0325461 A1 | 11/2018 | Carroll et al. | |

\* cited by examiner

AUTOMATED TUMOR PARTITIONING

CROSS REFERENCE TO RELATED APPLICATIONS

This application is a U.S. national phase application of International Application No. PCT/EP2018/073296 filed on Aug. 30, 2018, which claims the benefit of EP Application Serial No. 17192531.6 filed on Sep. 22, 2017, and is incorporated herein by reference.

FIELD OF INVENTION

The invention relates to medical imaging, in particular to the automated partitioning of tumors.

BACKGROUND OF THE INVENTION

Medical imaging techniques such as magnetic resonance imaging (MRI), positron emission tomography (PET), single photon emission computed tomography (SPECT), and other are effective in quantitatively mapping the internal structure of a subject. A knowledge of tumor heterogeneity on the molecular level (e.g. heterogeneity in terms of tumor pathways) would be useful for therapy planning. Multiple biopsies would provide this type of information, but are inconvenient for the patient, and impose some risks.

United Stated patent application US 2016/0260224 discloses a method for analyzing three-dimensional image data of a target region of a subject, the method comprising identifying a region of interest within the target region containing imaging information predictive of a disease state of the target region, calculating at least two radiomic features associated with the region of interest, and classifying the region of interest based on the calculated radiomic features.

SUMMARY OF THE INVENTION

The invention provides for a medical instrument, a computer program product, and a method in the independent claims. Embodiments are given in the dependent claims.

Embodiments of the invention provide means of measuring tumor heterogeneity in three dimensional medical images. A center point of the tumor is chosen and then orthogonal planes are used to divide the tumor into groups of voxels. One or more radiomic features are determined for each of the groups of voxels. A statistical measure with a scalar value is then calculated for each of the radiomic features. The statistical measures are then combined using weighting factors which are referred to as a predetermined group weighting value. They for example can be combined linearly, non-linearly, or using a mixture of terms that include linear and non-linear terms. The resulting linear combination is a scalar value which can be used as a measure of tumor heterogeneity.

In one aspect the invention provides for a medical instrument comprising a memory for storing machine-executable instructions. The medical instrument further comprises a processor to control the medical instrument. Execution of the machine-executable instructions cause the processor to receive three-dimensional medical image data descriptive of a subject. The three-dimensional medical image data comprises voxels. The three-dimensional medical image data may for example be received in a variety of different ways. It may be received by retrieving it from a memory, it may be received from another computer system via a network or other data transfer system, or it may be acquired by a medical imaging system that is part of the medical instrument or part of a different medical instrument.

Execution of the machine-executable instructions further cause the processor to receive a segmentation of the three-dimensional medical image data. The segmentation divides the three-dimensional medical image data into non-tumor voxels and tumor voxels. The segmentation again may be received in a variety of different ways. In one example the segmentation is received by applying a segmentation algorithm or module to the three-dimensional medical image data. In another example the segmentation may for example be received via a user interface. The segmentation may also be received from a memory and retrieved or it may be received from another computer system or another medical instrument. Execution of the machine-executable instructions further cause the processor to choose a center point of the tumor voxels. The choosing of the center point may also be performed in a variety of different ways. The three-dimensional volume defined by the tumor voxels could be used to define a mean point or a center of mass in some instances. In other instances various geometric volumes may be used to choose the center point. These are discussed below.

Execution of the machine-executable instructions further causes the processor to divide the tumor voxels into multiple groups using a set of orthogonal planes. The center point is within each of the orthogonal planes. Execution of the machine-executable instructions further cause the processor to calculate at least one group radiomic feature selected set of radiomic features for each of the multiple voxel groups. Execution of the machine-executable instructions further cause the processor to compute a statistical measure of reach of the at least one group radiomic feature. The statistical measure may for example be a measure of a statistical property. In this case the statistical measure is a scalar value derived from the properties of multiple radiomic features. For example each radiomic feature the statistical measure may be the variance. Other values such as the average or mean are also applicable.

Execution of the machine-executable instructions further cause the processor to calculate a scalar value by calculating the sum of each statistical measure multiplied by a predetermined group weighting value. The group weighting value is unique for each statistical measure. Execution of the machine-executable instructions further cause the processor to provide a signal using a signaling interface device if the scalar value is above a predetermined threshold. This embodiment may be beneficial because it may provide for a means of automatically signaling if the scalar value is above a predetermined threshold. This may be useful in the further operation of the medical instrument or notifying a user of the medical instrument.

The signaling interface device may for example be any sort of display device that is audio or visual in nature or it may also be used as a triggering device for an additional component of the medical instrument.

The set of orthogonal planes may for example be either two or three planes which divide the tumor into four or eight parts respectively. In another embodiment the tumor voxels are connected.

In another embodiment execution of the machine-executable instructions further cause the processor to construct a set of scalar values by performing a calculation of a scalar value for multiple rotational positions of the set of orthogonal planes about the center point. The providing of the signal is performed for a maximum scalar value selected from the set of scalar values. This embodiment may be beneficial because in some cases the tumor may be non-uniform or the center point may have been chosen at an inopportune position. In this embodiment the calculations for the scalar value is repeated with different orientation of the set of orthogonal planes. The signal is then based on the scalar value from the different positions of the orthogonal planes which gives the largest value. This may be beneficial because it increases the sensitivity of the method.

In another embodiment execution of the machine-executable instructions further cause the processor to calculate at least one global radiomic feature selected from the set of radiomic features for the tumor voxel. Execution of the machine-executable instructions further cause the processor to calculate a global statistical measure for each of the at least one global radiomic feature. The scalar value is further calculated by adding the sum of each global statistical measure multiplied by a predetermined global weighting value. The predetermined global weighting value is unique for each global statistical measure. This embodiment may be beneficial because it also includes values which are calculated for the entire tumor volume in addition to just for the individual groups which were determined using the set of orthogonal planes.

In another embodiment execution of the machine-executable instructions further cause the processor to receive the segmentation at least partially from a user interface.

In another embodiment execution of the machine-executable instructions further cause the processor to receive the segmentation at least partially by applying a segmentation algorithm to the three-dimensional image data.

In another embodiment the center point is chosen by calculating a center of mass of the tumor voxel.

In another embodiment the center point is chosen by identifying a center of a smallest sphere that encloses all of the tumor voxels.

In another embodiment the center point is chosen by identifying a center of the smallest sphere that encloses a given percentage of the tumor voxels. Instead of requiring that all tumor voxels be within a particular small sphere a certain percentage of the voxels are allowed to be outside of the sphere. This may help in identifying the bulk location or center of the tumor.

In another embodiment the center point is chosen by identifying a center of a largest sphere that encloses all of the tumor voxels.

In another embodiment the center point is chosen by identifying a center of a largest sphere that encloses a given percentage of the tumor voxels. In this embodiment the strict condition that the sphere encloses all the tumor voxels is relaxed.

In another embodiment the center point is chosen by identifying a center of a lowest volume ellipsoid that encloses all tumor voxels.

In another embodiment the center point is chosen by identifying a center of a lowest volume ellipsoid that encloses given percentage of the tumor voxels. This embodiment may be beneficial also because it relaxes the condition that all of the tumor voxels be within the lowest volume ellipsoid. This may help reduce the effect of outlying or small portions of the tumor mass.

In another embodiment the center point is chosen by using a linear combination or an average of the center point for any of the above mentioned methods.

In another embodiment execution of the machine-executable instructions further cause the processor to receive training medical image data. The training medical image data is multiple medical image data and the three-dimensional data is descriptive of multiple tumors. Execution of the machine-executable instructions further cause the processor to receive segmentations of the training medical image data. The segmentations divide the training medical image data into the non-tumor voxels and the tumor voxels. Execution of the machine-executable instructions further cause the processor to choose the center point for each of the training medical image data.

Execution of the machine-executable instructions further cause the processor to divide the tumor voxels into the multiple voxel groups using the set of orthogonal planes for each of the training medical image data. Execution of the machine-executable instructions further cause the processor to calculate the at least one group radiomic feature selected from the set of radiomic features for each of the multiple voxel groups for each of the training medical image data. Execution of the machine-executable instructions further cause the processor to compute the statistical measure of each of the at least one group radiomic feature for each of the training medical image data.

Execution of the machine-executable instructions further cause the processor to receive a tumor heterogeneity measure for each of the multiple tumors. Execution of the machine-executable instructions further cause the processor to calculate the predetermined group weighting value for the statistical measure of each of the training medical image data using a linear regression. The linear regression equates the tumor heterogeneity measure for each of the multiple tumors with the sum of each statistical measure for each of the training medical image data multiplied by the predetermined group weighting value. In this embodiment the process which was used for calculating the scalar value is repeated for multiple training medical image data. The resulting training data is then used to calculate the predetermined group weighting value by using linear regression or any other optimization method.

It should be noted that the training medical image data and the three-dimensional medical image data have the same imaging modality. That is to say for example if the three-dimensional medical image data is magnetic resonance imaging data then the training medical image data is also magnetic resonance imaging data.

In another embodiment the tumor heterogeneity measure is descriptive of any one of the following: a spatially dependent bio-analytical property, a spatially dependent DNA-sequence data, a spatially dependent RNA-activation data, spatially dependent biological receptor concentrations, and combinations thereof.

Each of the above for example could have been determined by one or multiple biopsies which provide each of these values in several different locations. This can provide a measure of the heterogeneity of a tumor.

In another embodiment the signaling interface device comprises a graphical user interface and the signal comprises a warning display and/or text message descriptive of the scalar value.

In another embodiment the signaling interface device comprises an audio sound generator and the signal comprises an audible signal such as a warning sign or an audible signal which is descriptive of the scalar value.

In another embodiment the signaling interface device comprises a biopsy plan generator and the signal comprises biopsy instructions. The biopsy instructions could for example be recalled from a set of predetermined biopsy instructions that are stored in a database.

In another embodiment the medical instrument comprises an automated biopsy system. Execution of the machine-executable instructions further cause the processor to control the automated biopsy system to perform a biopsy of the tumor if a signal is provided by the signaling device. This embodiment may be beneficial because the biopsy of the subject may be triggered automatically by the signal.

In another embodiment the set of radiomic features comprises any one of the following: a volume, a maximal length feature, a minimal length feature, a size dependent feature, a volume dependent feature, a histogram descriptor, an inter voxel relationship descriptor, a gray-level co-occurrence matrix, a run length matrix, a size zone matrix, a neighborhood gray tone difference matrix derived texture, one or more textures extracted after application of a filter, a surface texture measure, a fractal feature, and combinations thereof.

In another embodiment the medical instrument further comprises a medical imaging system. Execution of the machine-executable instructions further cause the processor to control the medical imaging system to acquire the three-dimensional medical image data from the subject. The processor receives the three-dimensional medical image data from the medical imaging system. This embodiment may be beneficial because the generation of the signal is integrated into the same instrument that acquires the medical imaging data.

In another embodiment the medical imaging system is a magnetic resonance imaging system.

In another embodiment the medical imaging system is a positron emission tomography system.

In another embodiment the medical imaging system is a single photon emission computed tomography system.

In another embodiment the medical imaging system is a computed tomography system.

In another embodiment the medical imaging system is a ultrasound system.

In another embodiment the medical instrument is a magnetic resonance imaging system. The three-dimensional medical image data is a diffusion weighted magnetic resonance image or a dynamic contrast enhanced magnetic resonance image or a series thereof. This embodiment may be beneficial because the diffusion weighted magnetic resonance image and the contrast enhanced magnetic resonance imaging are excellent for differentiating between tumor and non-tumor tissue.

In another aspect, the invention provides for a computer program product comprising machine-executable instructions for execution by a processor controlling the medical instrument. Execution of the machine-executable instructions causes the processor to receive three-dimensional medical image data descriptive of a subject. The three-dimensional medical image data comprises voxels. Execution of the machine-executable instructions further cause the processor to receive a segmentation of the three-dimensional medical image data. The segmentation divides the three-dimensional image data into non-tumor voxels and tumor voxels. Execution of the machine-executable instructions further cause the processor to choose a center point of the tumor voxels.

Execution of the machine-executable instructions further cause the processor to divide the tumor voxels into multiple groups using the set of orthogonal planes. The center point is within each of the orthogonal planes. Execution of the machine-executable instructions further cause the processor to calculate at least one group radiomic feature selected from the set of radiomic features for each of the multiple voxel groups. Execution of the machine-executable instructions further cause the processor to compute a statistical measure for each of the at least one radiomic feature.

Execution of the machine-executable instructions further cause the processor to calculate a scalar value by calculating the sum of each statistical measure multiplied by a predetermined group weighting value. The predetermined group weighting value is unique for each statistical measure. Execution of the machine-executable instructions further cause the processor to provide a signal using a signaling interface device if the scalar value is above a predetermined threshold. The advantages of this embodiment have been previously discussed.

In another aspect the invention provides for a method of analyzing a three-dimensional medical image. The method comprises receiving three-dimensional medical image data descriptive of a subject. The three-dimensional medical image data comprises voxels. The method further comprises receiving a segmentation of the three-dimensional medical image data. The segmentation divides the three-dimensional medical image data into non-tumor voxels and tumor voxels. The method further comprises choosing a center point of the tumor voxels. The method further comprises dividing the tumor voxels into multiple groups using a set of orthogonal planes.

The center point is within each of the orthogonal planes. The method further comprises calculating at least one group radiomic feature selected from the set of radiomic features for each of the multiple voxel groups. The method further comprises completing a statistical measure for each of the at least one group radiomic feature. The method further comprises calculating a scalar value by calculating the sum of each statistical measure multiplied by a predetermined group weighting value. The predetermined group weighting value is unique for each statistical measure. The method further comprises providing a signal using a signaling interface device if the scalar value is above a predetermined threshold. The advantages of this embodiment have been previously discussed.

It is understood that one or more of the aforementioned embodiments of the invention may be combined as long as the combined embodiments are not mutually exclusive.

As will be appreciated by one skilled in the art, aspects of the present invention may be embodied as an apparatus, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

Any combination of one or more computer readable medium(s) may be utilized. The computer readable medium may be a computer readable signal medium or a computer readable storage medium. A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which can be accessed by the processor of the computing device. Examples of computer-readable storage media include, but are not limited to: a floppy disk, a magnetic hard disk drive, a solid state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, Blu-Ray, or DVD-R disks. The term computer readable-storage medium also refers to various types of recording media capable of being accessed by the computer device via a network or communication link. For example a data may be retrieved over a modem, over the internet, or over a local area network. Computer executable code embodied on a computer readable medium may be transmitted using any appropriate medium, including but not limited to wireless, wire line, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

'Computer memory' or 'memory' is an example of a computer-readable storage medium. Computer memory is any memory which is directly accessible to a processor. 'Computer storage' or 'storage' is a further example of a computer-readable storage medium. Computer storage is any non-volatile computer-readable storage medium. In some embodiments computer storage may also be computer memory or vice versa.

A 'processor' as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object oriented programming language such as Java, Smalltalk, C++ or the like and conventional procedural programming languages, such as the "C" programming language or similar programming languages and compiled into machine executable instructions. In some instances the computer executable code may be in the form of a high level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It is understood that each block or a portion of the blocks of the flowchart, illustrations, and/or block diagrams, can be implemented by computer program instructions in form of computer executable code when applicable. It is further under stood that, when not mutually exclusive, combinations of blocks in different flowcharts, illustrations, and/or block diagrams may be combined. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A 'user interface' as used herein is an interface which allows a user or operator to interact with a computer or computer system. A 'user interface' may also be referred to as a 'human interface device.' A user interface may provide information or data to the operator and/or receive information or data from the operator. A user interface may enable input from an operator to be received by the computer and may provide output to the user from the computer. In other words, the user interface may allow an operator to control or manipulate a computer and the interface may allow the computer indicate the effects of the operator's control or manipulation. The display of data or information on a display or a graphical user interface is an example of providing information to an operator. The receiving of data through a keyboard, mouse, trackball, touchpad, pointing stick, graphics tablet, joystick, gamepad, webcam, headset, pedals, wired glove, remote control, and accelerometer are all examples of user interface components which enable the receiving of information or data from an operator.

A 'hardware interface' as used herein encompasses an interface which enables the processor of a computer system to interact with and/or control an external computing device and/or apparatus. A hardware interface may allow a processor to send control signals or instructions to an external computing device and/or apparatus. A hardware interface may also enable a processor to exchange data with an external computing device and/or apparatus. Examples of a hardware interface include, but are not limited to, a universal serial bus, IEEE 1394 port, parallel port, IEEE 1284 port, serial port, RS-232 port, IEEE-488 port, Bluetooth connection, Wireless local area network connection, TCP/IP connection, Ethernet connection, control voltage interface, MIDI interface, analog input interface, and digital input interface.

A 'display' or 'display device' as used herein encompasses an output device or a user interface adapted for displaying images or data. A display may output visual, audio, and or tactile data. Examples of a display include, but are not limited to, a computer monitor, a television screen, a touch screen, tactile electronic display, Braille screen, Cathode ray tube (CRT), Storage tube, Bi-stable display, Electronic paper, Vector display, Flat panel display, Vacuum fluorescent display (VF), Light-emitting diode (LED) displays, Electroluminescent display (ELD), Plasma display panels (PDP), Liquid crystal display (LCD), Organic light-emitting diode displays (OLED), a projector, and Head-mounted display.

Three dimensional medical image data as used herein encompasses a three dimensional data set which represents or is descriptive of a three dimensional volume of a subject. Three dimensional medical image data may be rendered as one or more images.

Magnetic Resonance (MR) data is defined herein as being the recorded measurements of radio frequency signals emitted by atomic spins using the antenna of a Magnetic resonance apparatus during a magnetic resonance imaging scan. MRF magnetic resonance data is magnetic resonance data. Magnetic resonance data is an example of medical image data. A Magnetic Resonance Imaging (MRI) image or MR image is defined herein as being the reconstructed two or three dimensional visualization of anatomic data contained within the magnetic resonance imaging data. This visualization can be performed using a computer.

A radiomic feature of an image or image data as used herein encompasses one or several quantitative features extracted from one or several medical images using data-characterisation or statistical algorithms.

BRIEF DESCRIPTION OF THE DRAWINGS

In the following preferred embodiments of the invention will be described, by way of example only, and with reference to the drawings in which.

DETAILED DESCRIPTION OF THE EMBODIMENTS

Like numbered elements in the figures are either equivalent elements or perform the same function. Elements which have been discussed previously will not necessarily be discussed in later figures if the function is equivalent.

Figure 1:
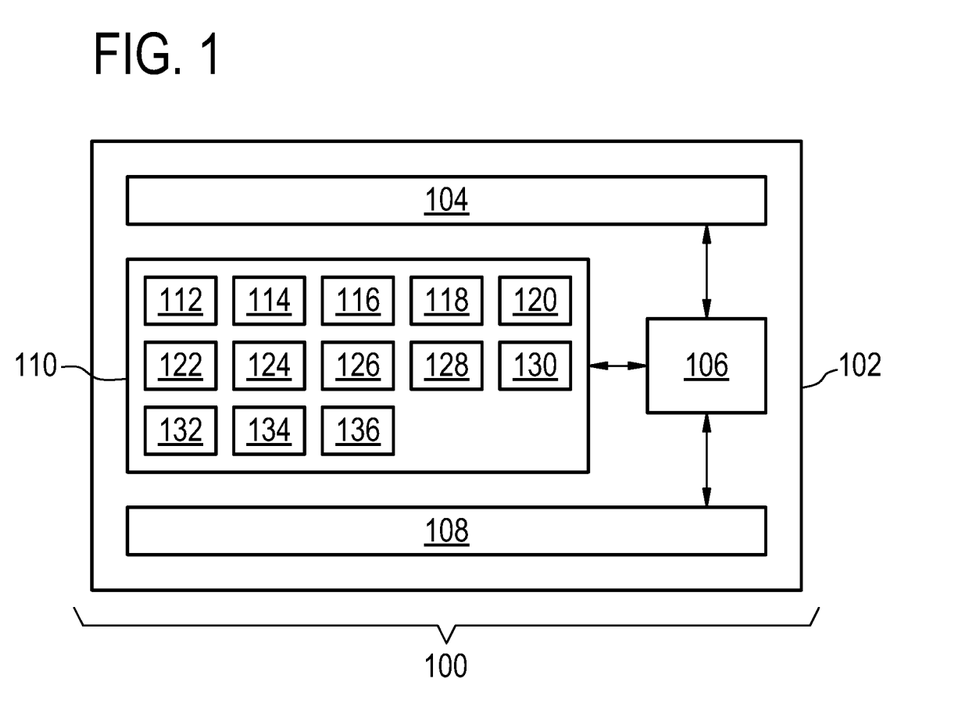
FIG. 1 illustrates an example of a medical instrument.

FIG. 1 shows an example of a medical instrument 100. The medical instrument 100 is shown as comprising a computer 102. The computer 102 comprises a processor 106 which is optionally connected to a hardware interface 104. The hardware interface 104 enables the processor 106 to control the operation and function of additional components. The processor 106 is also further shown as being connected to a user interface 108 and a memory 110. The memory 110 may be any combination of memory which is accessible to the processor 106. This may include such things as main memory, cached memory, and also non-volatile memory such as flash RAM, hard drives, or other storage devices. In some examples the memory 130 may be considered to be a non-transitory computer-readable medium.

The user interface 108 may include display, audio, and/or data entry components. For example the user interface 108 may be useful for displaying data, visual signals, and possibly even a graphical user interface. The user interface 108 may also contain an audio generation signal for generating an audio signal.

The memory 110 is shown as containing machine-executable instructions 112. The machine-executable instructions 112 enable the processor 106 to control the operation and function of the medical imaging system 100. In this example the machine-executable instructions 112 enable the processor 106 to perform various data analysis and manipulation functions. In other examples the machine-executable instructions 112 may enable the processor to control additional components via the hardware interface 104. The memory 110 is further shown as containing the three-dimensional medical image data 114 and a segmentation 116 of the three-dimensional medical image data. The three-dimensional medical image data 114 and the segmentation 116 may for example have been received from the medical imaging system, another storage device, or via a network interface. The segmentation 116 may also have been received manually or via the user interface 108.

The memory 110 is shown as containing a choice of a center point 118 for a part of the segmentation 116 that is identified as being tumor voxels. The memory 110 is further shown as containing multiple groups 120 which have been determined or identified from the segmentation 116. The memory 110 is further shown as containing a calculated group of radiomic features 122 for each of the multiple groups 120. The memory 110 is further shown as containing a statistical measure for each of the calculated group radiomic features 124. The memory 110 is further shown as containing a predetermined group weighting value 126 which are specific to each of the statistical measures 124. These are then multiplied and then added to calculate a scalar value 128.

The scalar value 128 can be compared to the predetermined value threshold 130 which is also shown as being stored in the memory 110. If the scalar value 128 is above the predetermined threshold 130 the processor 106 can generate a signal using the user interface 108. The scalar value 128 can also additionally be calculated by using values from a global radiomic feature which is calculated using the entire tumor volume of the tumor voxels. The memory 110 is shown as optionally containing a global radiomic feature 132. The memory is further shown as containing a global statistical measure 134 that was calculated from the global radiomic feature 132. The memory 110 is further shown as containing a predetermined global weighting value 136 that may be multiplied by each global statistical measure 134 and added to the scalar value 128. In this case the predetermined threshold 130 would also take into account the value determined in conjunction with the global statistical measure 134.

Figure 2:
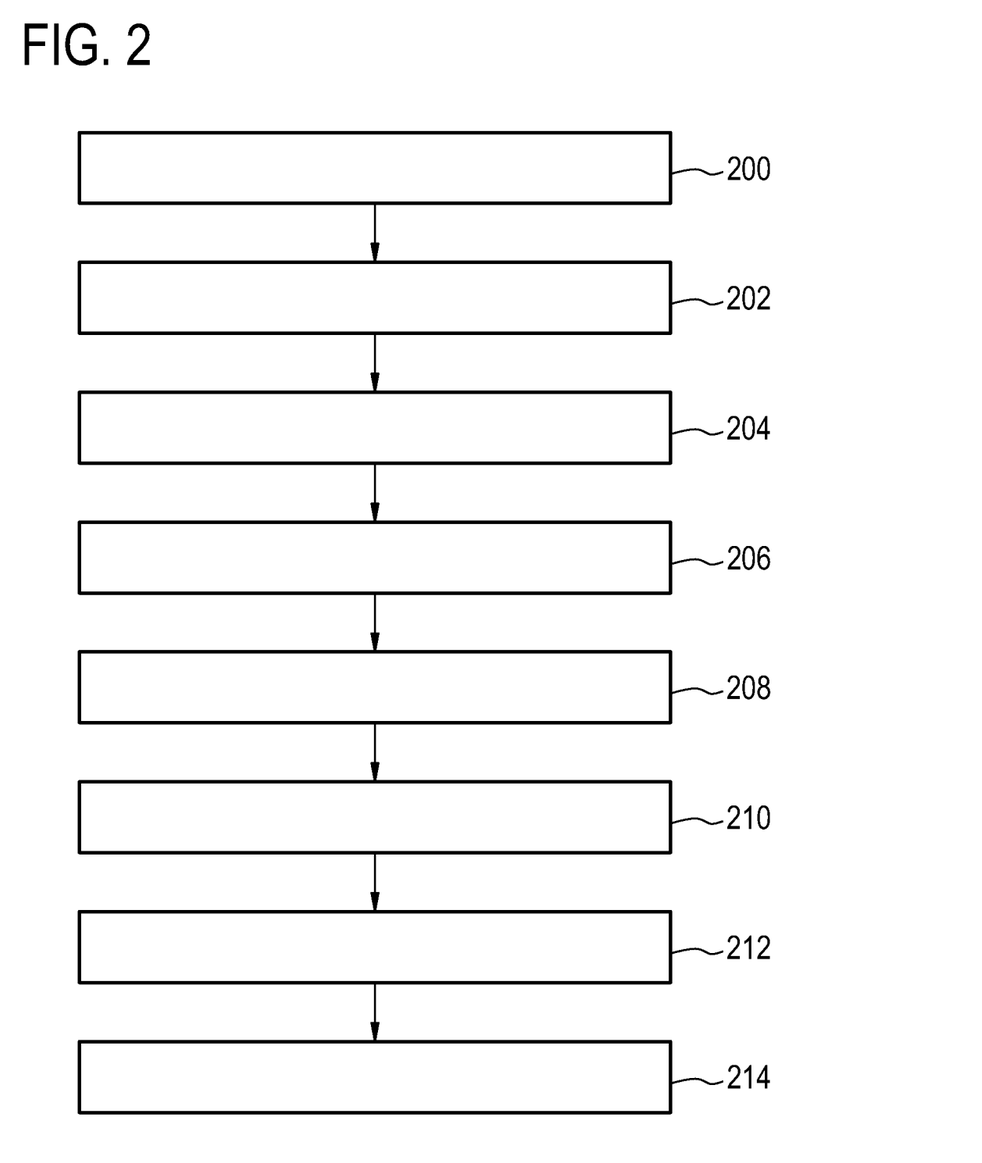
FIG. 2 shows a flow chart which illustrates a method of operating the medical instrument of FIG. 1.

FIG. 2 shows a flowchart which illustrates a method of operating the medical instrument 100 of FIG. 1. First in step 200 the three-dimensional medical image data 114 is received. The three-dimensional medical image data is descriptive of a subject. The three-dimensional medical image data comprises voxels. Next in step 202 the segmentation 116 is received. The segmentation divides the three-dimensional medical image data 114 into non-tumor voxels and tumor voxels. Next in step 204 the center point 118 is chosen. Next in step 206 the tumor voxels are divided into the multiple groups 120 using a set of orthogonal planes. The center point 118 is within each of the orthogonal planes. Then in step 208 the at least one group of radiomic features 122 is calculated. Next in step 210 a statistical measure 124 is calculated for each of the group of radiomic features 122. Then in step 212 the scalar value 128 is calculated. In step 214 a signal is provided via the user interface 108 if the scalar value 128 is above a predetermined threshold 130.

Figure 3:
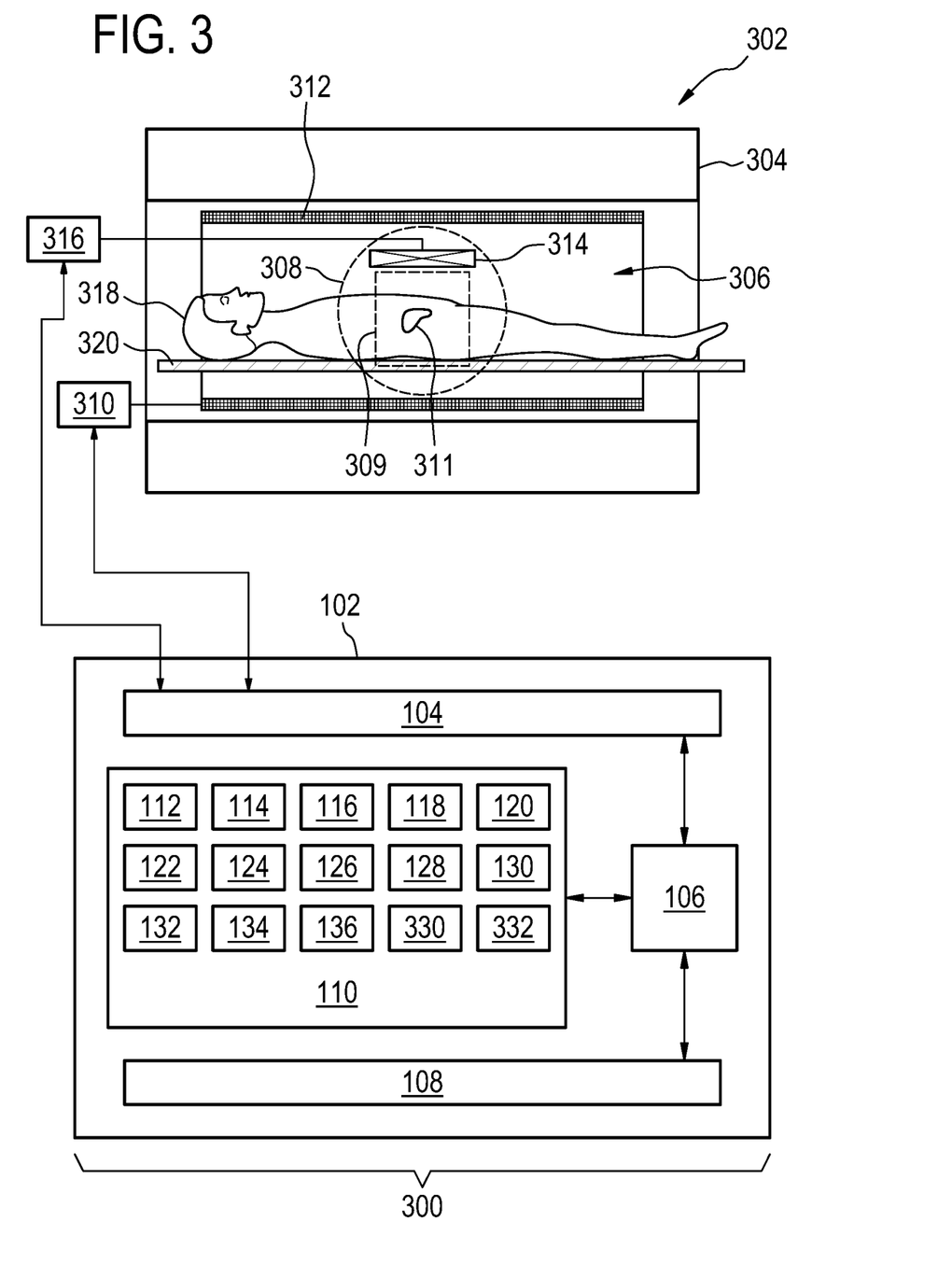
FIG. 3 illustrates a further example of a medical instrument.

FIG. 3 illustrates a further example of a medical instrument 300. The medical instrument of FIG. 3 is similar to the medical instrument in FIG. 1 except the medical instrument in FIG. 3 also comprises a magnetic resonance imaging system 302. The magnetic resonance imaging system 302 is intended to be exemplary and may be substituted by other imaging modalities such as positron emission tomography, single photon emission computed tomography, and computed tomography.

The magnetic resonance imaging system 302 comprises a magnet 304. The magnet 304 is a superconducting cylindrical type magnet with a bore 306 through it. The use of different types of magnets is also possible; for instance it is also possible to use both a split cylindrical magnet and a so called open magnet. A split cylindrical magnet is similar to a standard cylindrical magnet, except that the cryostat has been split into two sections to allow access to the iso-plane of the magnet, such magnets may for instance be used in conjunction with charged particle beam therapy. An open magnet has two magnet sections, one above the other with a space in-between that is large enough to receive a subject: the arrangement of the two sections area similar to that of a Helmholtz coil. Open magnets are popular, because the subject is less confined. Inside the cryostat of the cylindrical magnet there is a collection of superconducting coils. Within the bore 306 of the cylindrical magnet 304 there is an imaging zone 308 where the magnetic field is strong and uniform enough to perform magnetic resonance imaging. A region of interest 309 is shown within the imaging zone 308. A subject 318 is shown as being supported by a subject support 320 such that at least a portion of the subject 318 is within the imaging zone 308 and the region of interest 309. Within the region of interest 309 there can be seen a tumor 311.

Within the bore 306 of the magnet there is also a set of magnetic field gradient coils 310 which is used for acquisition of preliminary magnetic resonance data to spatially encode magnetic spins within the imaging zone 308 of the magnet 304. The magnetic field gradient coils 310 connected to a magnetic field gradient coil power supply 312. The magnetic field gradient coils 310 are intended to be representative. Typically magnetic field gradient coils 310 contain three separate sets of coils for spatially encoding in three orthogonal spatial directions. A magnetic field gradient power supply supplies current to the magnetic field gradient coils. The current supplied to the magnetic field gradient coils 310 is controlled as a function of time and may be ramped or pulsed.

Adjacent to the imaging zone 308 is a radio-frequency coil 314 for manipulating the orientations of magnetic spins within the imaging zone 308 and for receiving radio transmissions from spins also within the imaging zone 308. The radio frequency antenna may contain multiple coil elements. The radio frequency antenna may also be referred to as a channel or antenna. The radio-frequency coil 314 is connected to a radio frequency transceiver 316. The radio-frequency coil 314 and radio frequency transceiver 316 may be replaced by separate transmit and receive coils and a separate transmitter and receiver. It is understood that the radio-frequency coil 314 and the radio frequency transceiver 316 are representative. The radio-frequency coil 314 is intended to also represent a dedicated transmit antenna and a dedicated receive antenna. Likewise the transceiver 316 may also represent a separate transmitter and receivers. The radio-frequency coil 314 may also have multiple receive/transmit elements and the radio frequency transceiver 316 may have multiple receive/transmit channels. For example if a parallel imaging technique such as SENSE is performed, the radio-frequency could 314 will have multiple coil elements.

In this example the subject, 318 is positioned such that the subject's abdomen is within the region of interest 309. In other examples, other parts of the subject's 318 body may be positioned in the region of interest 309.

The transceiver 116 and the gradient controller 112 are shown as being connected to a hardware interface 104 of the computer system 102. The memory 110 is further shown as containing pulse sequence commands 330. The pulse sequence commands contain instructions which may be used to directly control the magnetic resonance imaging system to acquire magnetic resonance data 332 which is also shown as being stored in the memory 110. The processor 106 may reconstruct the magnetic resonance data 332 into the three-dimensional medical image data 114.

Figure 4:
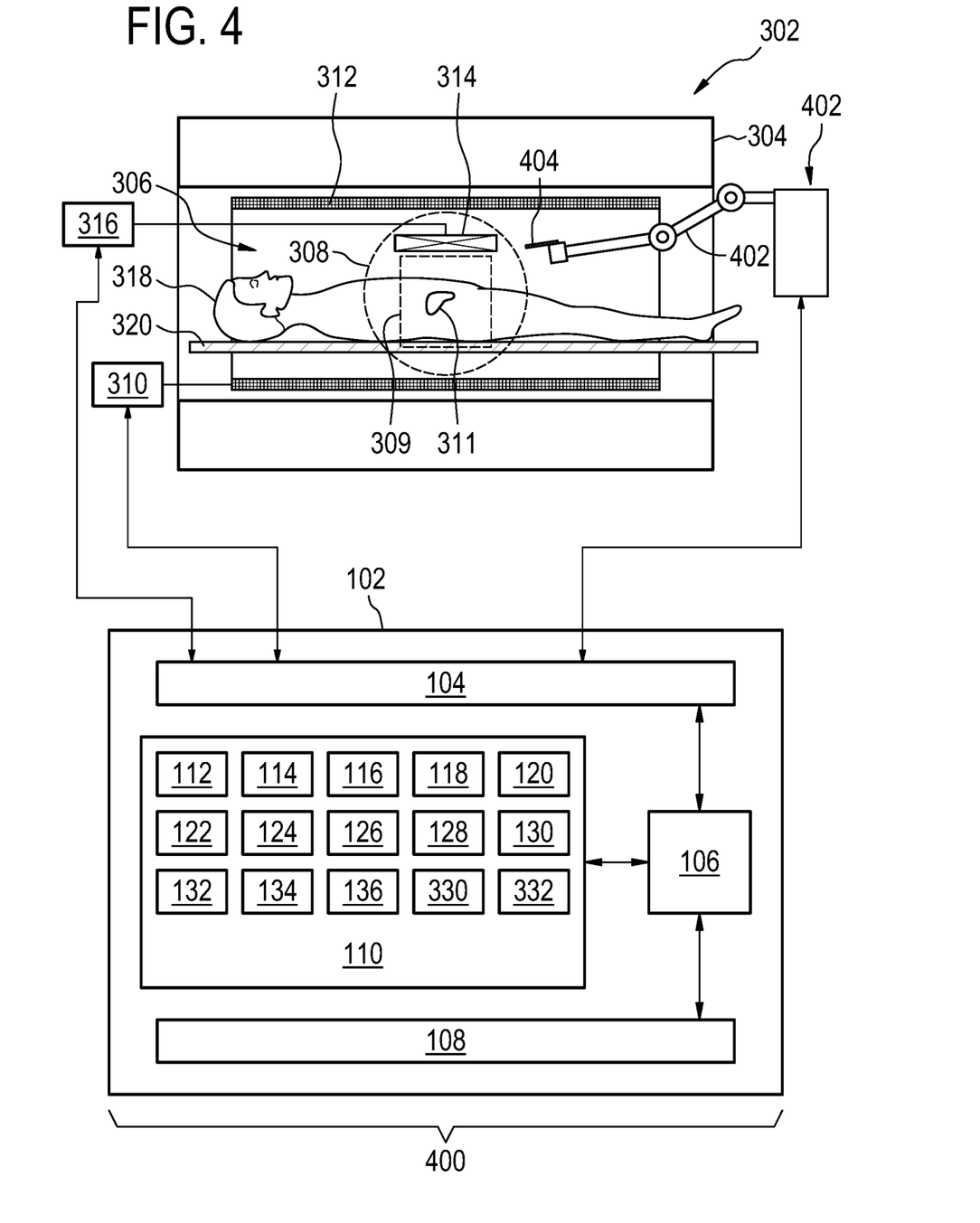
FIG. 4 illustrates a further example of a medical instrument.

FIG. 4 illustrates a further example of a medical instrument 400. The medical instrument shown in FIG. 4 is similar to that shown in FIG. 3 except there is additionally an automated biopsy system 400. When the scalar value 128 is above the predetermined threshold 130 the processor 106 can signal or control the automated biopsy system 400 to automatically perform a biopsy of the tumor 311. The automated biopsy system 400 may for instance comprise a robotic arm 402 and a needle biopsy system 404. In this example the medical imaging system is a magnetic resonance imaging system 302. In other examples the magnetic resonance imaging system 302 can be replaced with systems such as a CT or computer tomography system. The use of the automated biopsy system 400 may help to reduce the exposure of a physician to ionizing radiation.

In principle, MRI data (and to some extend CT and PET data) have rich information about tumors. But the information is not equally distributed. E.g. a cube in the center of a tumor does not contain information about the surface of the tumor. On the other hand, the molecular pathology information is gathered on samples that can be easily achieved by cutting the tumor. Therefore a partitioning is needed that matches image data analytics and pathology sampling simultaneously.

Examples may provide for a means of performing a pathway analysis on simple elements obtained by cuts all through the center of mass of the tumor. There is either one, two or three cuts resulting in 2, 4 and 8 segments. Provided the tumor is roughly spherical, all the segments share a volume with the same shape and likewise an equally shaped surface. On these volumes and surfaces, parameters are calculated ("radiomics"). These set of parameters (for example, for each segment about 10 distinct quantities) are further processed to yield a single value describing the apparent heterogeneity derived from image data. Ideally, this corresponds to the molecular heterogeneity derived from sample analysis. As it is unknown where a different part of the tumor resides, the evaluation process is repeated for different orientations in the imaging reference system (different angles for the first two cuts). For the final evaluation, the maximum of the scalar value is used.

Figure 5:
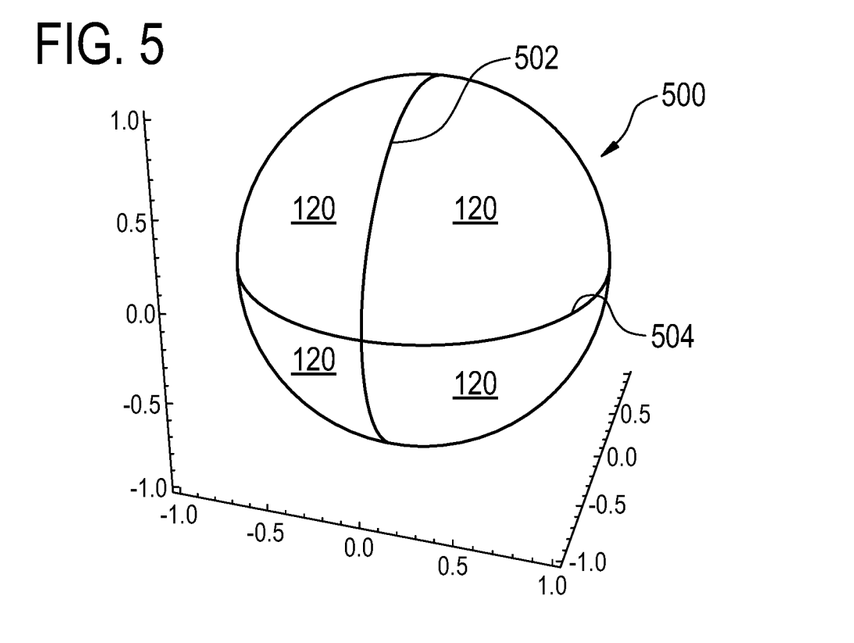
FIG. 5 illustrates the dividing of a tumor into four groups of voxels.

FIG. 5 shows a sphere which represents tumor voxels 500. The line labeled 502 defines a first orthogonal plane and the line 504 on the sphere defines a second orthogonal plane. It can be seen that these two orthogonal planes 502, 504 divide the tumor voxels 500 into multiple groups 120.

Figure 6:
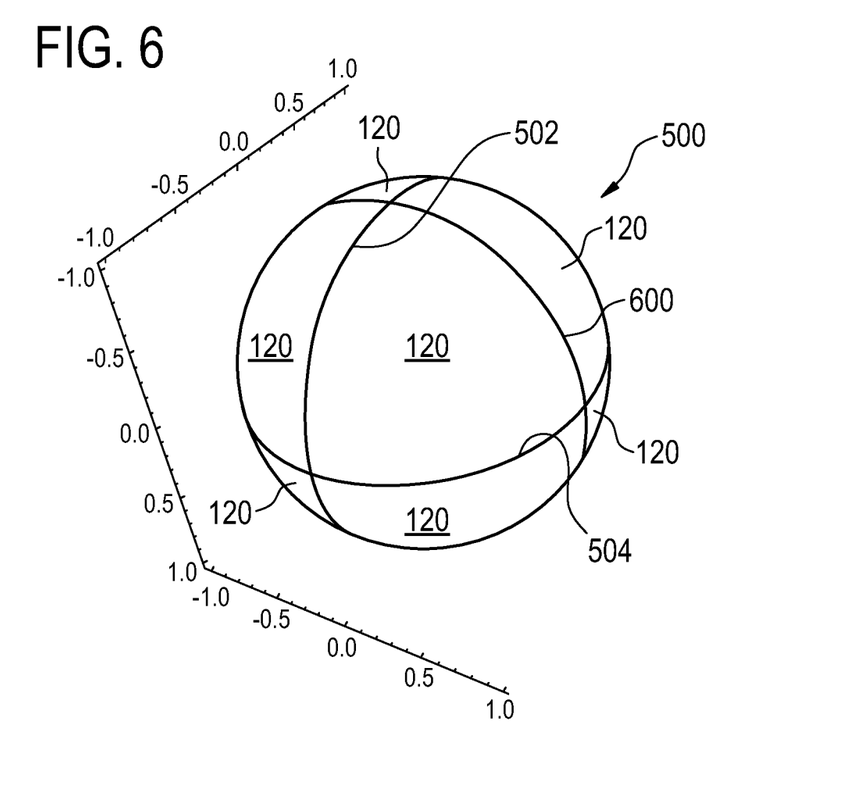
FIG. 6 illustrates the dividing of a tumor into eight groups of voxels.

FIG. 6 shows a further example of a spherical group of tumor voxels. FIG. 6 is similar to FIG. 5 except there is additionally a third orthogonal plane 600 that divides the tumor voxels 500 into eight multiple groups 120.

In the above figures, two examples of segmenting of a tumor are shown. FIG. 5 shows two cuts resulting in 4 segments. The FIG. 6 shows 3 cuts resulting in 8 segments. It can be clearly seen that all segments are congruent. For a non-spherical tumor, the situation can be more complicated. Basically, the center of mass may not be the ideal point through which all cuts have to go through. As an alternative to the center of mass, the center of the smallest sphere containing all tumor voxels may be used or the center of the largest sphere containing only tumor voxels may be employed. A linear combination of the position vectors may be used.

After applying the cuts, there is a set of (segmented) tumor voxels and corresponding sets of associated non tumor voxels. On these sets, a well-known evaluation process is applied to generate characteristic values (calculate different statistical measures). The characteristic values may be the number of tumor surface voxel to tumor voxels in the segment, excluding the cut surfaces. It may be the average signal increase due to contrast agent in the tumor, and the heterogeneity of signal increase in the segment. These values are only examples. In the literature hundreds of such values are described.

Essentially there are only a few distinct sets of values (in the order of 10) which are quite similar within the set but distinct between the different sets when analyzed for many tumors. There are also values that can only be computed for the whole tumor and not the segments, like total volume, eccentricity, location and so on. These values are also computed. Let us call the values for the whole tumor $w_i$ (the global radiomic feature) and for the individual segments $s_{ij}$ (the group radiomic feature) with i and j indices describing different characteristic values and different segments. Then $V_i$ could be the variance of the values $s_{ij}$ (variance over the segments j) or some other statistical measure. The total scalar value C may be $$C=(\Sigma_i k_i w_i)+(\Sigma_i l_i V_i)$$

i.e. the weighted sum of the global (whole tumor) values and the variances of the segment values. Naturally, there are a many possible formulas that can be used in the calculation. Variance can be replaced by any other value representing variability on a set of values (e.g. difference between highest and lowest value). Next to simple sums, products may be used or any other way to give rise to positive and negative influence to the result (products, power functions etc.). $k_i$ are the predetermined global weighting values. $l_i$ are the predetermined group weighting values.

The step of generating C values is repeated multiple times with different angles of cuts and the maximum C is chosen, whereas a set of 10 to 20 angles is assumed to be sufficient. However, more angles can eventually improve the evaluation process.

The weights (k and l) are adapted initially by an optimization process. For this, at given k and l, a discrimination value C' is chosen. A C higher than C' predicts a heterogeneity. If the sample actually has heterogeneity is checked by comparing the result to the molecular pathology data. This is done for all tumors in a test set. Then the C' k and l values are altered and a new test is performed. If this is better than the previous one, the weights are kept and the process is repeated until the best possible sensitivity is reached.

Examples may have been described in the context of MRI (e.g. DCE and diffusion) images, but can be applied to any imaging modality like computed tomography (CT) and positron emission tomography (PET). It is even possible to combine features from different imaging modalities.

Figure 7:
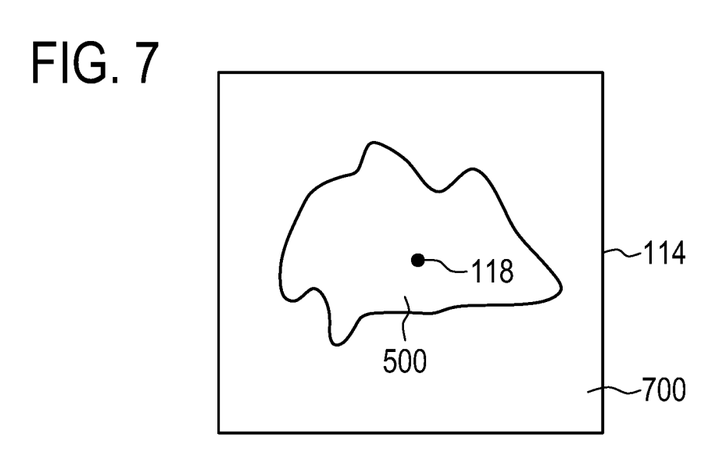
FIG. 7 illustrates a method of determining a tumor center.

FIG. 7 represents the three-dimensional medical image data 114 as a two-dimensional plot. It can be seen that the medical image data 114 is segmented into tumor voxels 500 and non-tumor voxels 700. Also shown is a center point 118. The center point in FIG. 7 was determined by determining a center of gravity of the tumor voxels 500.

Figure 8:
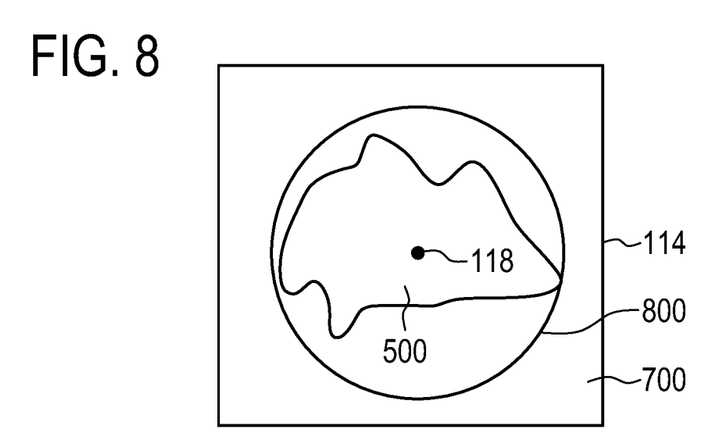
FIG. 8 illustrates a further method of determining a tumor center.

FIG. 8 shows another rendering of the three-dimensional medical image data 114. The plot in FIG. 8 is similar to FIG. 7 except the location of the center point 118 is different. In this example a sphere 800 was used that have the minimum volume that encompassed all of the tumor voxels 500. The center of this sphere 800 was then chosen as the center point 118. The example in FIG. 8 may also be modified. Instead of taking the smallest volume into which all of the tumor voxels 500 fit, a certain number or percentage of the voxels 500 could be allowed to be outside of the sphere 800 also. Additionally, other shapes instead of a sphere 800 could also be chosen. For example, an ellipsoid could be used in place of a sphere 800.

Figure 9:
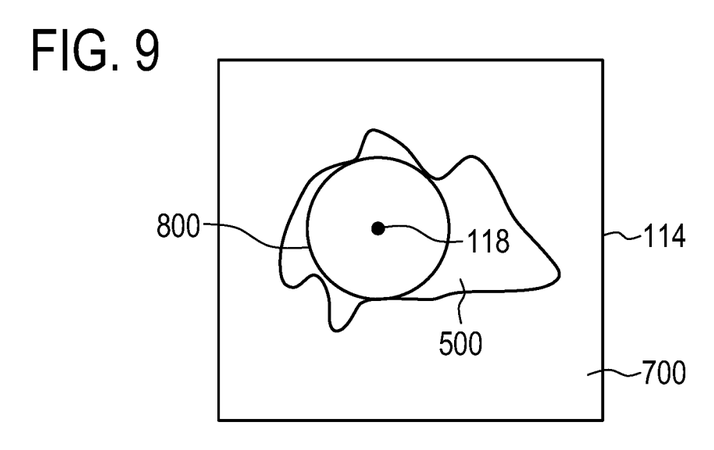
FIG. 9 illustrates a further method of determining a tumor center.

FIG. 9 shows a further view of the two-dimensional representation of the three-dimensional medical image data 114. The example in FIG. 9 is similar to the example in FIG. 8 except the sphere 800 is now the largest sphere which fits inside all of the tumor voxels 500. It can be seen that the center point 118 is located in a slightly different position. As with FIG. 8 the strict condition of all the voxels needing to be within the sphere 800 can also be relaxed or a different shape can be chosen. When choosing the location of the center point 118 a variety of methods such as are illustrated in FIGS. 7, 8 and 9 can all be chosen and the location of the center 118 can for example be averaged or combined using a linear combination.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

LIST OF REFERENCE NUMERALS 100 medical instrument
102 computer
104 hardware interface
106 processor
108 user interface
110 memory
112 machine executable instructions
114 three dimensional medical image data
116 segmentation
118 choice of center point
120 multiple groups
122 calculated group radiomic features
124 statistical measure for each of the calculated group radiomic features
126 predetermined group weighting value
128 scalar value
130 predetermined threshold
132 global radiometric feature
134 global statistical measure
136 predetermined global weighting value
200 receive three dimensional medical image data descriptive of a subject
202 receive a segmentation of the three dimensional medical image data
204 choose a center point of the tumor voxels
206 divide the tumor voxels into multiple groups using a set of orthogonal planes, wherein the center point is within each of the orthogonal planes
208 calculate at least one group radiomic feature selected from a set of radiomic features for each of the multiple voxel groups
210 compute a statistical measure for each of the at least one group radiomic feature
212 calculate a scalar value by calculating the sum of each statistical measure multiplied by a predetermined group weighting value, wherein the predetermined group weighting value is unique for each statistical measure
214 provide a signal using a signaling interface device if the scalar value is above a predetermined threshold
300 medical instrument
302 magnetic resonance imaging system
304 magnet
306 bore of magnet
308 imaging zone
309 region of interest
310 magnetic field gradient coils
311 tumor
312 magnetic field gradient coil power supply
314 radio-frequency coil
316 transceiver
318 subject
320 subject support
330 pulse sequence commands
332 medical image data
400 automated biopsy system
402 robotic arm
404 needle biopsy system
500 tumor voxels
502 first orthogonal plane
504 second orthogonal plane
600 third orthogonal plane
700 non-tumor voxels
800 sphere

The invention claimed is:

1. A medical instrument comprising:
a memory for storing machine executable instructions;
a processor for controlling the medical instrument, wherein execution of the machine executable instructions cause the processor to:
receive three dimensional medical image data descriptive of a subject, wherein the three dimensional medical image data comprises voxels;
receive a segmentation of the three dimensional medical image data, wherein the segmentation divides the three dimensional image data into non-tumor voxels and tumor voxels;
choose a center point of the tumor voxels;
divide the tumor voxels into multiple groups using a set of orthogonal planes, wherein the center point is within each of the orthogonal planes;
calculate (208) at least one group radiomic feature selected from a set of radiomic features for each of the multiple voxel groups;
compute a statistical measure for each of the at least one group radiomic feature;
calculate a scalar value by calculating the sum of each statistical measure multiplied by a predetermined group weighting value wherein the predetermined group weighting value is unique for each statistical measure; and
provide a signal using a signaling interface device if the scalar value is above a predetermined threshold.

2. The medical instrument of claim 1, wherein execution of the machine executable instructions further causes the processor to construct a set of scalar values by performing the calculation of the scalar value for multiple rotational positions of the set of orthogonal planes about the center point, and wherein the providing of the signal is performed for a maximum scalar value selected from the set of scalar values.

3. The medical instrument of claim 1, wherein execution of the machine executable instructions further cause the processor to:
calculate at least one global radiometric feature elected from the set of radiomic features for the tumor voxels; and
calculate a global statistical measure for each of the at least one global radiometric feature, wherein the scalar value is further calculated by adding the sum of each global statistical measure multiplied by a predetermined global weighting value wherein the predetermined global weighting value is unique for each global variance.

4. The medical instrument of claim 1, wherein execution of the machine executable instructions further causes the processor to perform any one of the following:
receive the segmentation at least partially from a user interface;
receive the segmentation at least partially by applying a segmentation algorithm to the three dimensional image data; and
combinations thereof.

5. The medical instrument of claim 1, wherein the center point is chosen using any one of the following:
calculating a center of mass of the tumor voxels;
identifying a center of a smallest sphere that encloses all of the tumor voxels;
identifying a center of a smallest sphere that encloses a given percentage of the tumor voxels;
identifying a center of a largest sphere that encloses all of the tumor voxels;
identifying a center of a largest sphere that encloses the given percentage of the tumor voxels;
identifying a center of a lowest volume ellipsoid that encloses all tumor voxels; and
identifying a center of a lowest volume ellipsoid that encloses the given percentage of the tumor voxels; and
a linear combination or an average thereof.

6. The medical instrument of claim 1, wherein execution of the machine executable instructions further causes the processor to:
receive training medical image data, wherein the training medical image data is three dimensional data descriptive of multiple tumors;
receive segmentations of the training image data, wherein the segmentations divide the training medical image data into the non-tumor voxels and the tumor voxels;
choose the center point for each of the training medial image data;
divide the tumor voxels into the multiple voxel groups using the set of orthogonal planes for each of the training medical image data;
calculate the at least one group radiomic feature selected from the set of radiomic features for each of the multiple voxel groups for each of the training medical image data;
compute the statistical measure of each of the at least one group radiomic feature for each of the training medical image data;
receive a tumor heterogeneity measure for each of the multiple tumors; and
calculate the predetermined group weighting value for the statistical measure of each of the training medical image data using an optimization, wherein the optimization equates the tumor heterogeneity measure for each of the multiple tumors with the sum of each statistical measure for each of the training medical image data multiplied by the predetermined group weighting value.

7. The medical instrument of claim 6, wherein the tumor heterogeneity measure is descriptive of any one of the following:
a spatially dependent bio-analytical property;
spatially dependent DNA-sequence data:
spatially dependent RNA activation data;
spatially dependent biological receptor concentrations and
combinations thereof.

8. The medical instrument of claim 1, wherein any one of the following:
the signaling interface device comprises a graphical user interface and the signal comprises a warning display and/or a text message descriptive of the scalar value;
the signaling interface device comprises an audio sound generator and the signal comprises an audible signal;
the signaling interface device comprises a biopsy plan generator and the signal comprises biopsy instructions; and
combinations thereof.

9. The medical instrument of claim 1, wherein the medical instrument comprise an automated biopsy system, wherein execution of the machine executable instructions cause the processor to control the automated biopsy system to perform a biopsy of the tumor if the signal is provided by the signaling device.

10. The medical instrument of claim 1, wherein the set of radiomic features comprises any one of the following:
a volume;
a maximal length feature;
a minimal length feature;
a size dependent feature;
a volume dependent feature;
a histogram descriptor;
an inter voxel relationship descriptor;
a gray-level co-occurrence matrix;
a run length matrix;
a size zone matrix,
a neighborhood gray tone difference matrix derived texture;
one or more textures extracted after application of a filter;
a surface texture measure;
a fractal feature; and
combinations thereof.

11. The medical instrument of claim 1, wherein the medical instrument further comprises a medical imaging system, wherein execution of the machine executable instructions further cause the processor to control the medical imaging system to acquire the three dimensional medical image data from the subject, and wherein the processor receives the three dimensional medical image data from the medical imaging system.

12. The medical instrument of claim 11, wherein the medical imaging system is any one of the following: a magnetic resonance imaging system, a positron emission tomography system, a single photon emission computed tomography system, an ultrasound system, and a computed tomography system.

13. The medical instrument of claim 11, wherein the medical instrument is a magnetic resonance imaging system, wherein the three dimensional medical image data is any one of the following: a diffusion weighted magnetic resonance image and a dynamic contrast enhanced magnetic resonance imaging or a series thereof.

14. A non-transitory computer-readable medium having a computer program product comprising machine executable instructions for execution by a processor controlling a medical instrument, wherein execution of the machine executable instructions cause the processor to: receive three dimensional medical image data descriptive of a subject, wherein the three dimensional medical image data comprises voxels; receive a segmentation of the three dimensional medical image data, wherein the segmentation divides the three dimensional image data into non-tumor voxels and tumor voxels; choose a center point of the tumor voxels; divide the tumor voxels into multiple groups using a set of orthogonal planes, wherein the center point is within each of the orthogonal planes; calculate at least one group radiomic feature selected from a set of radiomic features for each of the multiple voxel groups; compute a statistical measure for each of the at least one group radiomic feature; calculate a scalar value by calculating the sum of each statistical measure multiplied by a predetermined group weighting value, wherein the predetermined group weighting value is unique for each statistical measure; and provide a signal using a signaling interface device if the scalar value is above a predetermined threshold.

15. A method of analyzing three dimensional medical image data, wherein the method comprises:

receiving three dimensional medical image data descriptive of a subject, wherein the three dimensional medical image data comprises voxels;

receiving a segmentation of the three dimensional medical image data, wherein the segmentation divides the three dimensional image data into non-tumor voxels and tumor voxels;

choosing a center point of the tumor voxels;

dividing the tumor voxels into multiple groups using a set of orthogonal planes, wherein the center point is within each of the orthogonal planes;

calculating at least one group radiomic feature selected from a set of radiomic features for each of the multiple voxel groups;

computing a statistical measure for each of the at least one group radiometric feature;

calculating a scalar value by calculating the sum of each statistical measure multiplied by a predetermined group weighting value, wherein the predetermined group weighting value is unique for each statistical measure; and providing a signal using a signaling interface device if the scalar value is above a predetermined threshold.

* * * * *